Dec. 15, 1936.                    J. M. NAUL                    2,064,680
              ELECTRIC MOTOR WITH LOW VOLTAGE LIGHTING TAPS
                        Filed April 23, 1935            2 Sheets-Sheet 1
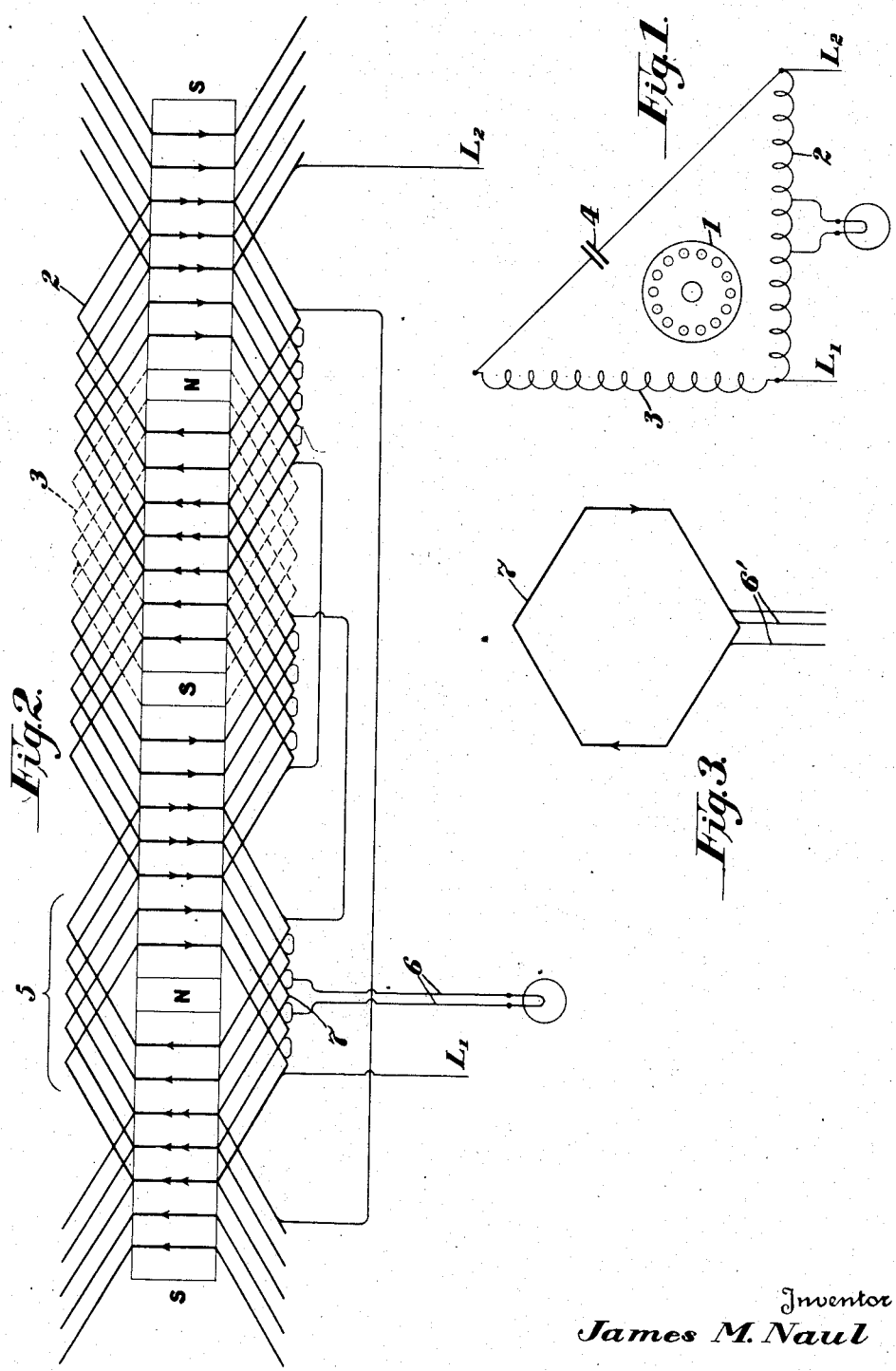
Inventor
James M. Naul
Witness:
John N. Cave
By Henry J. Miller
Attorney Dec. 15, 1936.　　　　　　　J. M. NAUL　　　　　　2,064,680
ELECTRIC MOTOR WITH LOW VOLTAGE LIGHTING TAPS
Filed April 23, 1935　　　2 Sheets-Sheet 2
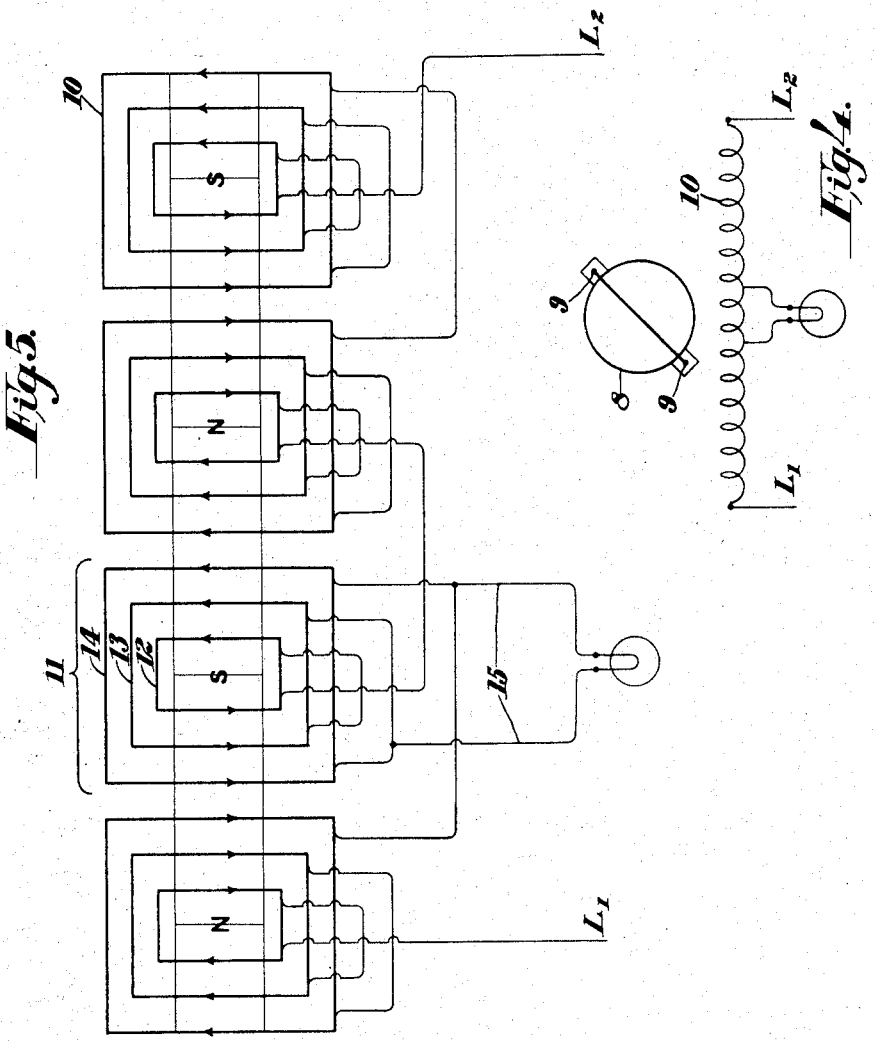
Inventor
James M. Naul
Witness:
John H. Cave
By Henry J. Miller
Attorney Patented Dec. 15, 1936

2,064,680

UNITED STATES PATENT OFFICE 2,064,680

ELECTRIC MOTOR WITH LOW VOLTAGE LIGHTING TAPS

James M. Naul, Fanwood, N. J., assignor to The Singer Manufacturing Company, Elizabeth, N. J., a corporation of New Jersey Application April 23, 1935, Serial No. 17,761

4 Claims. (Cl. 172—275)

This invention relates to the electric lighting of machines driven by electric motors. It has heretofore been proposed to use for machine lighting purposes, lamps of lower voltage than that customarily distributed for general lighting purposes, as such low voltage lamps have strong filaments and resist rough usage. To avoid the necessity of providing an additional low voltage distributing system or a multiplicity of special low-voltage lighting transformers, it has also been proposed to provide the individual machine-driving motors with one or more taps from which a low voltage current may be obtained for operating an individual low-voltage lamp.

Difficulties have however, been experienced in providing satisfactory illumination by use of these expedients as it is found that in many cases the illumination fluctuates to a troublesome extent when the load on the motor is varied and particularly when the load is suddenly thrown onto the motor, as in the operation of a sewing machine by an electric power-transmitter of the manually operated friction clutch type, such as represented in the application of W. J. Peets et al., Serial No. 702,288, filed Dec. 14, 1933.

The present invention has for an object to provide a self-starting single-phase alternating current motor suitable for use with an individual clutch mechanism for the control of a sewing machine and having low voltage lighting taps so contrived that voltage fluctuations in the lighting circuit are reduced to a minimum and are substantially independent of load variations and/or the direction of rotation of the motor.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

I have discovered that the desired ends may be attained by taking the low-voltage taps from the main or exciting stator winding of the motor so as to bridge only turns of a coil which is arranged symmetrically relative to the magnetic center of a polar group of coils and is at least as large as any other coil of said group. The coil or fraction thereof bridged by the low-voltage taps must be disposed symmetrically relative to the magnetic center of the polar group of coils of which it forms a part and must span as large a portion of the polar area as possible; being of at least as great a span as any other coil of the polar group.

In the accompanying drawings Fig. 1 is a diagrammatic view of a single phase condenser motor embodying the invention. Fig. 2 is a diagram of the tapped stator winding of the motor shown in Fig. 1. Fig. 3 is a diagram of a modified central coil of one of the polar groups of coils of the main winding shown in Fig. 2. Fig. 4 is a diagrammatic view of a single phase repulsion induction motor embodying the invention, and Fig. 5 is a diagram of the tapped stator winding of the motor shown in Fig. 4.

The motor of Figs. 1, 2 and 3 has the usual squirrel cage rotor 1 and main stator winding 2 connected to the line $L_1L_2$. Disposed in electrical quadrature with the main winding 2 is the auxiliary winding 3 which may be connected in series with the condenser 4 across the terminals of the main winding 2 to produce the desired starting torque in the rotor; the rotor torque being reversible by reversing the connections to either the main or auxiliary windings, as is well understood.

By referring to Fig. 2 it will be observed that the main winding 2 and auxiliary winding 3 which is in quadrature therewith are of the type known as lap windings, being each composed of an odd number or five coils of uniform span arranged in polar groups one of which is indicated at 5 having its magnetic center at N within such group. The low voltage lighting taps 6 connected to the main winding 2 bridge only the center coil 7 of the polar group 5 of coils; the center coil 7 being symmetrically disposed relative to the magnetic center N of the coil group 5. In case the voltage developed across the center coil 7 is too low, the number of turns therein must be increased. If the voltage is too high taps 6' bridging only a fraction of the total number of turns of the center coil 7 may be taken off, as shown in Fig. 3.

It will be understood by those skilled in the art that where the number of turns of the main winding bridged by the low voltage lighting taps are arranged symmetrically with respect to the magnetic center of a polar group of main winding coils, a reactionary shift of the field under load conditions will be the same with respect to the tapped coil regardless of the direction of rotation of the motor, and where the span of the tapped coil is at least as great as the span of any other coil of the winding, the fluctuation of the low voltage under load conditions of the motor will not be troublesome.

In Figs. 4 and 5 of the drawings, the invention is shown as embodied in a motor of the repulsion induction type having an armature 8 with short circuited commutator brushes 9. The main exciting winding is shown at 10 and is connected to the line $L_1L_2$. The main winding 10 is of the type having polar groups of concentric coils, one of such groups being indicated at 11. In the particular instance shown there are three coils 12, 13, 14 per polar group. These coils are each symmetrically disposed relative to the magnetic center S embraced thereby but are of different spans, the inner coil 12 spanning two stator teeth, the intermediate coil 13 spanning four stator teeth and the outer coil 14 spanning six stator teeth. Hence the outer coil 14 is selected for the low-voltage lighting taps 15 which may bridge as many turns of the coil 14 as may be necessary to obtain the desired low voltage. In the drawings the entire coil 14 is shown as bridged by the low voltage taps 15. The starting torque and direction of rotation of the rotor 8 are, of course, controlled by the position of the short-circuited brushes 9.

While I have diagrammatically shown a lamp as connected to the lighting taps 6 and 15 in Figs. 2 and 5, respectively, it will be understood that the motor is ordinarily supplied by the manufacturer with the low-voltage lighting taps only, connected to the main winding in the predetermined relation to the coils thereof as hereinbefore explained.

It is immaterial to the invention whether the starting torque of the motor is obtained by use of a squirrel cage rotor with main and auxiliary windings of any known type, or by use of a wound armature with the usual commutator and short circuited brushes together with an exciting stator winding. It is also immaterial to the invention whether the stator windings are lap windings or concentric windings.

Having thus set forth the nature of the invention, what I claim herein is:—

1. A single-phase alternating current motor having a slotted stator and a rotor, a main stator winding including connected polar groups of coils, the coils of each group being disposed in different stator slots, said motor being provided with means predetermining the tapping of said main winding for an auxiliary low-voltage circuit bridging turns of only that coil which is arranged symmetrically relative to the magnetic center of a polar group of coils and the span of which is at least as great as that of any other coil of said group.

2. A single-phase alternating current motor having a slotted stator and a rotor, a main stator winding including connected polar groups of coils, the coils of each group varying in span and being disposed concentrically in different stator slots, said motor being provided with means predetermining the tapping of said main winding for an auxiliary low-voltage circuit bridging turns of only the coil of maximum span of a polar group of coils.

3. A single-phase alternating current motor having a slotted stator and a rotor, a main stator winding including connected polar groups of coils, there being an odd number of coils of uniform span per group distributed in lap formation in different stator slots, said motor being provided with means predetermining the tapping of said main winding for an auxiliary low-voltage circuit bridging turns of only the central coil of a polar group of coils.

4. A single-phase alternating current motor having a slotted stator and a rotor, a main stator winding including connected polar groups of coils, the coils of each group being disposed in different stator slots, and a low-voltage lamp-circuit connected to said main winding and bridging turns of only that coil which is arranged symmetrically relative to the magnetic center of a polar group of coils and the span of which is at least as great as that of any other coil of said group.

JAMES M. NAUL.